(12) United States Patent
Herrero

(10) Patent No.: US 11,722,309 B2
(45) Date of Patent: Aug. 8, 2023

(54) AUTHENTICATION OF COMPUTER DEVICES WITHOUT PASSWORD STORAGE

(71) Applicant: Johnson Controls Tyco IP Holdings LLP, Milwaukee, WI (US)

(72) Inventor: Rolando Herrero, Amherst, NH (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 193 days.

(21) Appl. No.: 17/370,943

(22) Filed: Jul. 8, 2021

(65) Prior Publication Data
US 2023/0012084 A1  Jan. 12, 2023

(51) Int. Cl.
*H04L 9/32* (2006.01)
*H04L 9/40* (2022.01)
*G06F 7/58* (2006.01)

(52) U.S. Cl.
CPC .......... *H04L 9/3236* (2013.01); *H04L 63/083* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 6,959,394 B1 * | 10/2005 | Brickell | G06Q 20/3829 726/19 |
| 9,305,161 B1 | 4/2016 | Juels et al. | |
| 2018/0145826 A1 | 5/2018 | Greatwood | |
| 2022/0255737 A1 * | 8/2022 | Ebrahimi | H04L 9/0863 |

FOREIGN PATENT DOCUMENTS

WO    2018093944 A1    5/2018

OTHER PUBLICATIONS

International Search Report and Written Opinion in PCT/US2022/073468, dated Oct. 24, 2022, 12 pages.

* cited by examiner

*Primary Examiner* — Nelson S. Giddins
(74) *Attorney, Agent, or Firm* — ArentFox Schiff LLP

(57) ABSTRACT

An apparatus and method for performing authenticated communications that includes receiving, by a gateway device, a password associated with an application. The gateway device is in communication with a plurality of access control devices associated with the application. Access to each device in a cluster formed by the gateway device and the plurality of access control devices requires a user authentication associated with the password. The gateway device generates a plurality of different matching pairs of salt values and hash values and deletes the password. In addition, the gateway device transmits different sets of mismatched pairs of the salt values and the hash values to at least two devices of the cluster for storage. The user authentication is based on a salt value and a hash value from the plurality of different matching pairs of salt values and hash values stored at two different devices of the cluster.

21 Claims, 7 Drawing Sheets

AUTHENTICATION OF COMPUTER DEVICES WITHOUT PASSWORD STORAGE

BACKGROUND

The present disclosure relates generally to the field of computer systems, and more specifically, to authentication of computer devices without password storage, such as in an Internet-of-Things (IoT) System.

Generally, the traditional approach to IoT device authentication relies on securely storing passwords. Digital environments are now becoming more complex with the myriad of new and emerging digital devices intended to address many user and consumer needs such as communication, entertainment, privacy and security, etc. However, the traditional approach contemplating secure storage of passwords is used even in somewhat complex scenarios with gateways interfacing between devices and analytics applications. In this case the gateway pushes passwords down to the devices in a secure way. However, this authentication approach works only if it is possible to store passwords in the different devices that support authentication.

Accordingly, improvements in authentication for devices and gateways is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure provide an authentication approach for devices and gateways unable to securely store passwords. In an aspect, for example, the present disclosure includes a method of performing authenticated communications that includes receiving, by a gateway device, a password associated with an application. The gateway device is in communication with a plurality of access control devices associated with the application. Access to each device in a cluster formed by the gateway device and the plurality of access control devices requires a user authentication associated with the password. The gateway device generates a plurality of different matching pairs of salt values and hash values and deletes the password. In addition, the gateway device transmits different sets of mismatched pairs of the salt values and the hash values to at least two devices of the cluster for storage. The user authentication is based on a salt value and a hash value from the plurality of different matching pairs of salt values and hash values stored at two different devices of the cluster.

In another aspect, for example, the present disclosure includes a method for authenticating a user device using a plurality of access control devices storing distributed entries of a salt hash table. The method includes receiving, by a first access control device, an authentication request from the user device. The authentication request includes a password. A random number is generated by the first access control device. A hash value request message is sent by the first access control device to a second access control device selected using a first mathematical function based on the generated random number. The second access control device stores a first set of mismatched pairs of salt values and hash values of the salt hash table including the hash value that is associated with the random number. A salt value request message is sent, by the first access control device, to a third access control device selected using a second mathematical function based on the generated random number. The third access control device stores a second set of mismatched pairs of salt values and hash values of the salt hash table including the salt value that is associated with the random number. The salt value is sent, by the first access control device, to the user device, in response to receiving the salt value from the third access control device. A hash string is received, by the first access control device, from the user device. The hash string is compared, by the first access control device, with the hash value received from the second access control device. A successful authentication response is sent, by the first access control device, to the user device, in response to determining that the hash string received from the user device is equal to the hash value received from the second access control device.

Additional aspects may include an apparatus including a memory and a processor coupled with the memory and configured to perform either of the above-noted methods. Further aspects may include a computer-readable medium storing instructions executable by a processor to perform either of the above-noted methods.

In another aspect, a system for authenticating a user device using a plurality of access control devices storing distributed entries of a salt hash table includes a hardware processor of a first access control device configured to receive an authentication request from the user device and generate a random number. The authentication request includes a password. The hardware processor is further configured to send a hash value request message to a second access control device selected using a first mathematical function based on the generated random number and send a salt value request message to a third access control device selected using a second mathematical function based on the generated random number. The second access control device stores a first set of mismatched pairs of salt values and hash values of the salt hash table including the hash value that is associated with the random number The third access control device stores a second set of mismatched pairs of salt values and hash values of the salt hash table including the salt value that is associated with the random number. The hardware processor is further configured to send the salt value to the user device, in response to receiving the salt value from the third access control device, receive a hash string from the user device, compare the hash string with the hash value received from the second access control device; and send a successful authentication response to the user device, in response to determining that the hash string received from the user device is equal to the hash value received from the second access control device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Traditional user authentication mechanisms rely on storing passwords on embedded devices. Many embedded devices do not support secure storage (i.e., the file system may not support secure storage). Storing passwords in this case can lead to security vulnerabilities. Various aspects described herein address this problem by utilizing network security mechanisms to distribute security parameters throughout the network and removing the need of storing passwords.

In certain aspects, IoT devices may include devices characterized by varying sensor, processing, storage, interface, and/or communications capabilities. Additionally, in some aspects, the one or more provisioned services may be consistent with sensor, processing, storage, interface, and/or communications capabilities of the IoT devices, and further, may be associated with and available to an authenticated owner or owners of the IoT devices. For example, the one or more services may include, but are not limited to, access control services (e.g., which enable the owner of the device to grant the device access to various computational resources available to the owner), payment services (e.g., provided by corresponding financial institutions, utilities, merchants, governmental entities, etc.), and/or device-configuration services (e.g., which enable an owner of a device to configure one or more operations characteristics of the device). The disclosed aspects are not limited to these services, and in other instances, the disclosed aspects may authenticate any additional or alternate service that is available to the authenticated owner or owners and consistent with the capabilities of the IoT devices.

Figure 1:
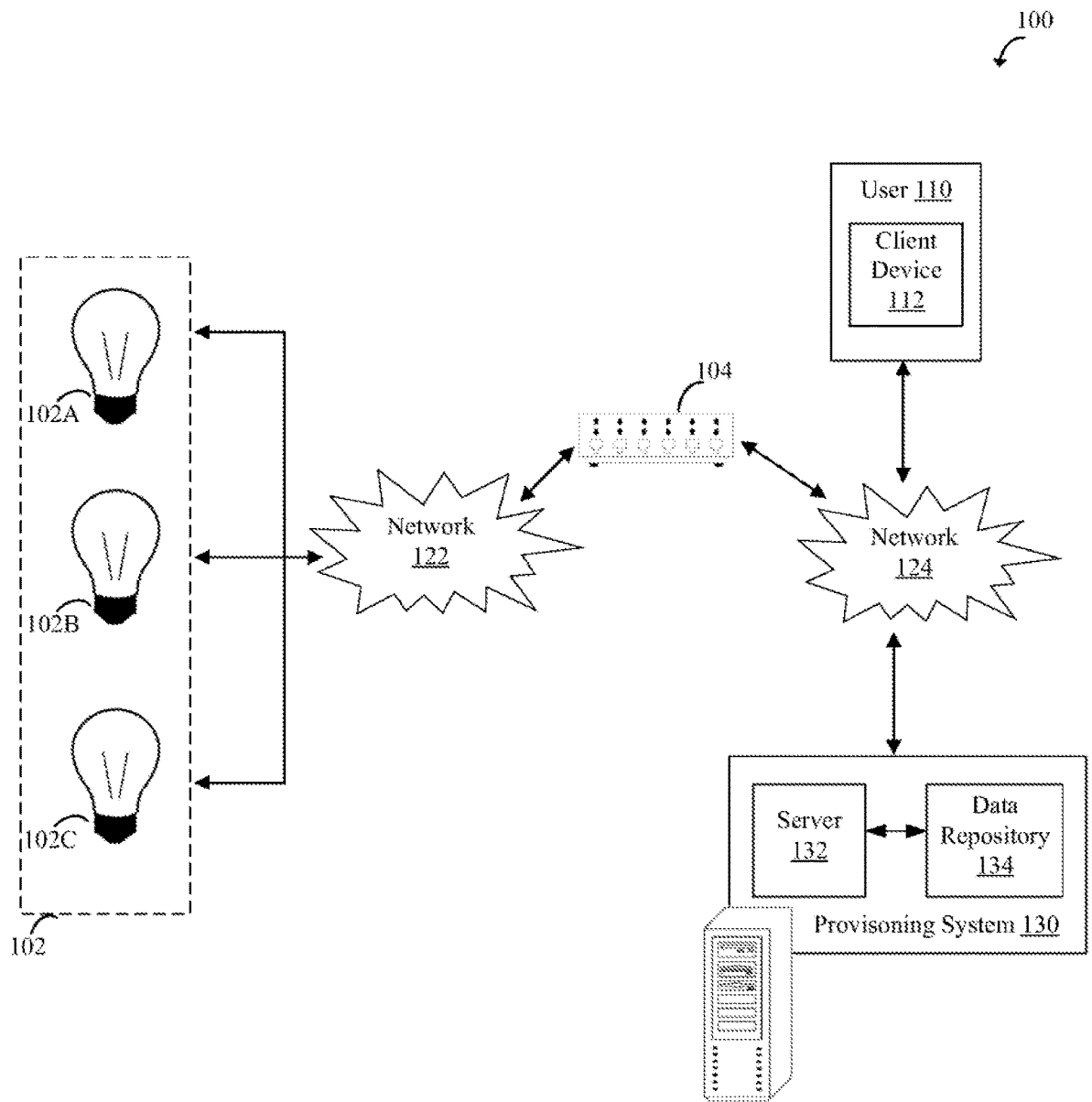
FIG. 1 is a diagram of an exemplary computing environment, consistent with the disclosed aspects.

FIG. 1 illustrates an exemplary computing environment 100 consistent with certain disclosed aspects of authentication of a computer device without password storage. In one aspect, computing environment 100 may include a plurality of Internet-of-Things (IoT) devices 102, which may be connected to and exchange data with a gateway device 104 across a communications network, such as network 122. For example, as illustrated in FIG. 1, IoT devices 102 may include a first IoT device 102A, a second IoT device 102B, and a third IoT device 102C. The disclosed aspects are, however, not limited to three IoT devices communicating across network 122, and in further aspects, IoT devices 102 may include any additional or alternate number of connected IoT devices. Computing environment 100 may also include a client device 112 and a provisioning system 130, and an additional communications network, e.g., network 124, which may interconnect gateway device 104, client device 112, and provisioning system 130.

In certain aspects, IoT devices 102 may include a plurality of individual devices or "things" that possess functionality sufficient to establish and maintain communications with gateway device 104 across network 122 (and additionally or alternatively, with other components of computing environment 100, either through gateway device 104 or directly across networks 122 and/or 124). Individual IoT devices consistent with the disclosed aspects may include, but are not limited to, a network-connected component of a security or access-control system (e.g., a network-connected digital camera, a "smart" lock, etc.), a handheld, wearable, or embedded computing device (e.g., a smartphone, a tablet computer, a smart watch, a wearable fitness monitor, a device in communication with a smart fabric or textile, etc.); a wireless printer or copy machine; a wired or wireless network router; a network-connected lighting fixture (e.g., a LED-based smart light bulb), a network-connected appliance (e.g., a "smart" refrigerator, stove, coffee-maker, furnace, heat pump, etc.); and/or a network-connected, smart thermostat.

In certain aspects, each of IoT devices 102 may include one or more tangible, non-transitory memories that store data and/or software applications (e.g., one or more executable application modules), and one or more hardware-based processors (e.g., a micro-processor or micro-controller) configured to execute portions of the stored software applications. For example, IoT devices 102 may store, in the corresponding memories, software applications that, when executed by the corresponding processing devices, cause IoT devices 102 to perform operations consistent with the authentication services. Further, each of IoT devices 102 may also include communications module, such as a wireless transceiver device, coupled to the corresponding processors and configured by the corresponding processors to establish and maintain communications sessions with gateway device 104 across network 122, as described below.

One or more of IoT devices 102 may also include a sensor capable of detecting an operational status, a device characteristic, and additionally or alternatively, a consumption of one or more resources at various temporal intervals during an operation of the one or more of IoT devices 102. By way of example, sensors consistent with the disclosed aspects may include, but are not limited to, positional sensors (e.g., global positioning system (GPS) units), accelerometers, temperature sensors, motion sensors, sensors capable of measuring a consumption of electricity, water, or other resources, sensors capable of measuring units of received or transmitted data, and/or sensors capable of detecting a state of corresponding actuator devices, such as fluidic valves and electrical switches. The corresponding processors may, in some instances, execute portions of the stored software instructions to generate data indicative of the time-varying operational status, device characteristics, and/or consumption, and to store portions of the generated data within the corresponding tangible, non-transitory memories.

Gateway device 104 may, in some aspects, include a computing device (e.g., a smart phone, tablet computer, etc.) or a computing system configured to establish communications sessions with IoT devices 102 and manage interactions between IoT devices 102 and other components of computing system 100, such as provisioning system 130 across network 124. For instance, gateway device 104 may include one or more tangible, non-transitory memories that store data and/or software instructions (e.g., one or more application modules), and one or more processors configured to execute portions of the stored software applications. In certain embodiments, and as described below, gateway device 104 may store application modules that, when executed by the one or more processors, cause gateway device 104 to detect IoT devices 102 communicating across network 122, register IoT devices 102 onto network 122 and, in conjunction with provisioning system 130, perform operations that provision one or more available services to IoT devices 102.

In certain aspects, network 122 may facilitate direct communication and data exchange between each of IoT devices 102, and further, between each of IoT devices 102 and gateway device 104, and may include one or more wireless communication networks or mediums of short-range, digital data communication. Examples of network 122 include, but are not limited to, a wireless local area network (e.g., a wireless "LAN" or "WiFi" network), a RF network, a Near Field Communication (NFC) network, an optical communications network (e.g., a wireless infrared (IR) communications network, etc.), a Bluetooth™ communications network (e.g., networks using Bluetooth™ or Bluetooth LE™ communications protocols), or a wireless Metropolitan Area Network (MAN) connecting any of the communications networks described above. Additionally, and consistent with exemplary aspects of the present disclosure, local network 122 may include a private or internal network or networks, a wide area network (e.g., a "WAN," such as the Internet), and/or a publicly accessible network or networks interconnected via one or more communication protocols, including, but not limited to, hypertext transfer protocol (HTTP), transmission control protocol/internet protocol (TCP/IP), extensible messaging and presence protocol (XMPP), message queuing telemetry transport (MQTT) protocols, constrained application protocol (CoAP), data distribution service (DDS) protocols, ZigBee™ communications protocols, and NFC protocols.

Provisioning system 130 may be a computing system configured to execute software instructions (e.g., one or more executable application modules) that perform one or more operations consistent with disclosed aspects. In some aspects, provisioning system 130 may correspond to a distributed system that may include computing components distributed across one or more networks, such as network 124, or other networks. Furthermore, provisioning system 130 may also be associated with a business entity, e.g., a financial institution, an e-commerce retailer, and/or a physical retailer, which may be associated with and/or provide one or more of the provisioned services. For example, and as described below, provisioning system 130 may be associated with an access control and/or security system of a building, and one or more of the services provisioned to IoT devices 102 may include a reporting service associated with an account held by an owner or owners of IoT devices 102 of the building or an administrator of the access control and/or security system.

In some aspects, provisioning system 130 may include computing components configured to store, maintain, and generate data and software instructions. For example, provisioning system 130 may include one or more servers (e.g., server 132) and tangible, non-transitory memory devices (e.g., data repository 134). Server 132 may include one or more computing devices that may be configured to execute software applications (e.g., one or more executable application modules) to perform one or more processes consistent with the disclosed embodiments. In one example, server 132 may be a computing device that executes software instructions (e.g., application modules, etc.) that, as described below, may authenticate an identity of an owner IoT devices 102, authenticate and verify an identity of IoT devices 102, and further, provide data to IoT devices 102 that facilitates a performance of operations consistent with one or more available services.

In some instances, the available services may be consistent with one or more sensor, processing, storage, interface, and communications capabilities of IoT devices 102, and the provided data may include, but is not limited to, elements of executable code (e.g., application modules, etc.), service-related cryptograms, authentication data, and/or other service-related data that enables IoT devices 102 to perform the operations consistent with the available services. Additionally, the provided data, upon receipt and processing by IoT devices 102, may provision IoT devices 102 with the available services.

In one aspect, server 132 may include a computer (e.g., a personal computer, network computer, server, or mainframe computer) having one or more processors that may be selectively activated or reconfigured by computer programs. In one aspect, server 132 (or other computing components of provisioning system 130) may be configured to provide one or more websites, digital portals, etc., that provide services consistent with the business entity, such as a digital e-commerce or banking portal, and services consistent with disclosed aspects. For instance, server 132 may be configured to provide information associated with a requested web page over network 124 to a client device (such as client device 112), which may render the received information and present content from the web page on a display device, e.g., a touchscreen display unit. Additionally, server 132 may be incorporated as a corresponding node in a distributed network, and additionally or alternatively, as a corresponding networked server in a cloud-computing environment. Furthermore, server 132 may communicate via network 124 with one or more additional servers (not shown), which may facilitate the distribution of processes for parallel execution by the additional servers.

Data repository 134 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments, as described below. Data repository 134 may also be configured to store information relating to the business entity, such as information identifying one or more authentication credentials associated with one or more owners of IoT devices 102 and further, information verifying the identity (e.g., device identifiers, passwords etc.) of IoT devices 102.

In some aspects, client device 112 may be a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain aspects, client device 112 may be associated with one or more users, such as user 110. For instance, user 110 may operate client device 112 and may do so to cause client device 112 to perform one or more operations consistent with the disclosed aspects.

Client device 112 may, in some aspects, include one or more tangible, non-transitory memories that store data and/or software instructions, and one or more processors configured to execute software instructions. Client device 112 may include one or more display devices that display information to a user and one or more input device(s) to allow the user to input information to client device 112 (e.g., keypad, keyboard, touchscreen, voice activated control technologies, or any other type of known input device). Additionally, in certain aspects, client device 112 may store in memory one or more software applications that run on client device 112 and are executed by the one or more processors, such as web browsers and various applications associated with provisioning system 130, as described below Network 124 may include one or more communication networks or medium of digital data communication. Examples of communication network 124 include a local area network (LAN), a wireless LAN (e.g., a "WiFi" network), a RE network, a Near Field Communication (NEC) network, a wireless Metropolitan Area Network (MAN) connecting multiple wireless LANs, NFC communication link(s), and a wide area network (WAN), e.g., the Internet. Consistent with aspects of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed aspects also include protocols facilitating data transfer using radio frequency identification (RFID) communications and/or NFC. Moreover, communications network 120 may also include one or more mobile device networks, such as a GSM network or a PCS network, allowing client device 112 to send and receive data via applicable communications protocols, including those described herein.

Although computing environment 100 is illustrated in FIG. 1 with provisioning system 130 in communication with gateway device 104 and client device 112 across network 124, and with IoT devices 102 or other computer devices in communication with gateway device 104 across local network 122, persons of ordinary skill in the art will recognize that environment 100 may include any additional number of client devices 112, any additional number of connected, IoT devices or other computer devices and corresponding gateway devices, and any additional number of computers, systems, or servers without departing from the spirit or scope of the disclosed aspects. Further, although described in terms of networks 122 and 124, the disclosed aspects are not limited to this network configuration, and in additional aspects, any additional or alternate number of communications networks and corresponding network gateway devices may interconnect the components of computing environment 100, including network configurations that include a single communications network with no network gateway device. Moreover, although described in FIG. 1 in reference to individual IoT devices 102A, 102B, and 102C, persons of ordinary skill in the art will recognize that IoT devices 102 may include any additional or alternate number of individual IoT devices, which may include a single IoT device in communication with gateway device 104 across local network 122.

As noted above, the traditional approach to IoT device authentication relies on securely storing passwords. A particular network packet flow for the scenarios with gateways interfacing between devices and analytics applications relies on the message exchange as follows. First, a user computing device sends an authentication request to an authentication device. Second, in response, the authentication device generates a random hash value and transmits it to the user computing device. Next, the user computing device forms a string by appending the password to the salt, calculates hash' (one way mapping function) over the formed string and transmits the hash' string to the authentication device. The salt is a random value that is used as part of the authentication mechanism. Finally, the authentication device forms a string by appending the password to the salt and calculating hash over the formed string. Then, the authentication device compares the computed hash value with the transmitted hash' value. If the compared values are identical then authentication was successful.

The aforementioned mechanism removes the need of transmitting passwords over the communication channel. In this case, the password is a common secret for which a hash function is applied. Utilization of the salt value provides the needed randomization. However, this authentication approach works only if it is possible to store passwords in the different devices that support authentication. For devices (like, for example, access control devices) and gateways that do not have capabilities of securely storing passwords, the authentication flow described above is not necessarily possible to implement.

Advantageously, one aspect of the present disclosure introduces a mechanism to support authentication that is randomized by a salt and that removes the need of storing passwords. In addition to improving security, the authentication technique described below also provides an internal security parameter distribution protocol between various devices and the gateway.

Various aspects presented in this disclosure do not require any devices and/or gateways to store any security related information. Furthermore, security related information, such as a password, code, or PIN that an application will need to transmit for authentication purposes may be used to generate a large number, N, of random salt values and corresponding hash strings. An interface unit or gateway that receives the security related information from the application may dynamically generate a table of salt values and hash values, or portion thereof.

Figure 2:
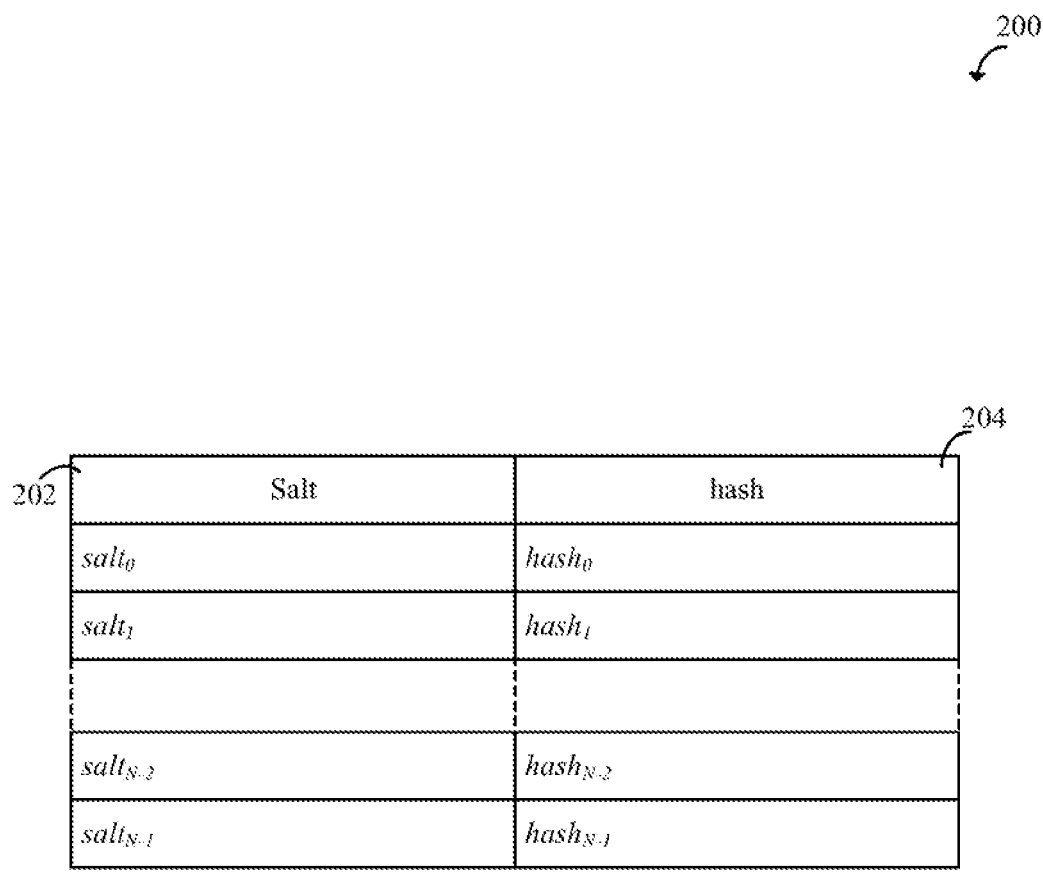
FIG. 2 is a schematic diagram illustrating an exemplary salt hash table.

FIG. 2 is a schematic diagram illustrating an exemplary salt hash table 200 containing N salt/hash pairs. In some aspects, gateway device 104 may be configured to provide various salt values 202 and hash values 204 to other members/devices of the computing environment 100. For example, in an aspect to enhance the security of the system, the gateway device 104 may be configured to distribute only non-matching pairs of salt values 202 and hash values 204 to one or more of the respective members/devices of the computing environment 100, which may then be stored at each respective member/device. Additionally, at least some of the non-matching pairs of entries of the salt hash table 200 may be stored by the gateway device 104 itself.

Figure 3:
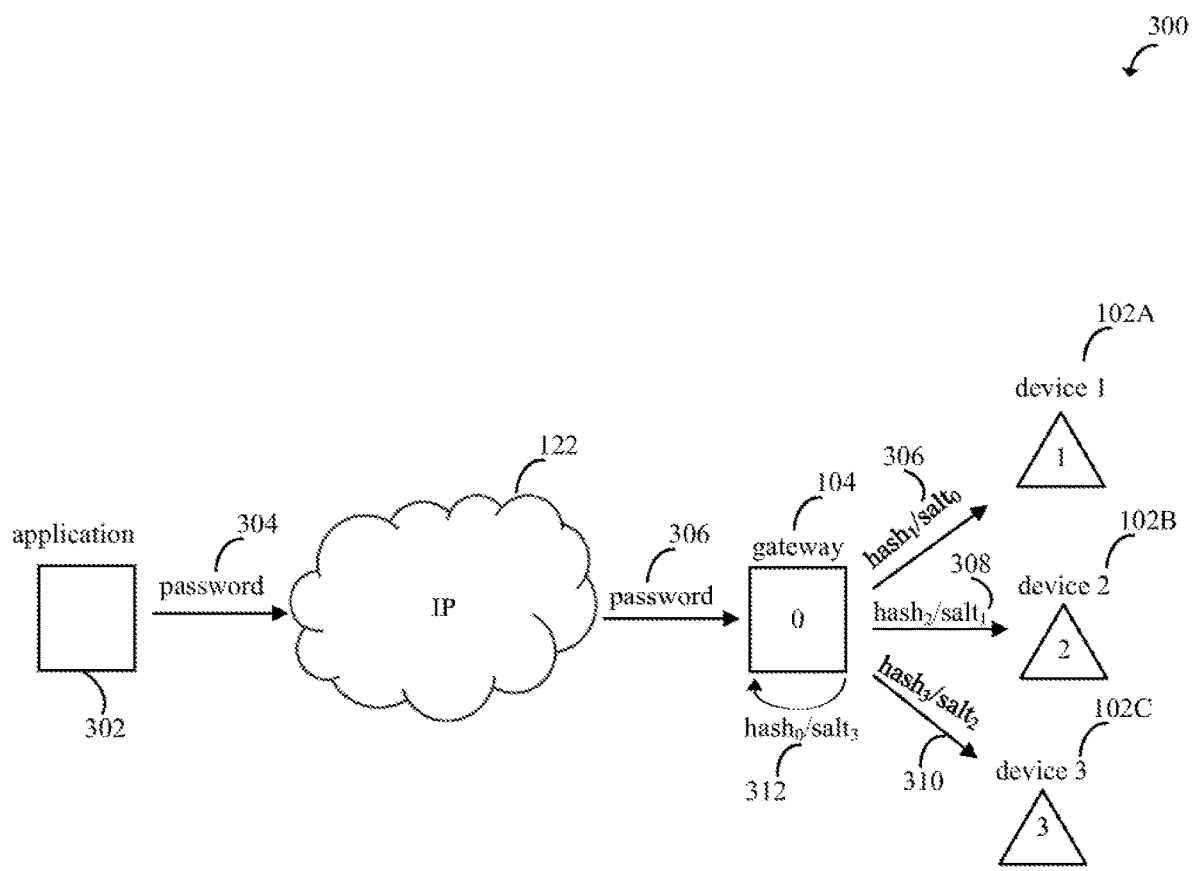
FIG. 3 is an additional diagram illustrating portions of an exemplary computing environment, consistent with the disclosed aspects.

FIG. 3 is an additional diagram 300 illustrating portions of an exemplary computing environment, consistent with the disclosed aspects. FIG. 3 illustrates an algorithm for distribution of the entries of the salt hash table 200. For determination of whether a user is authorized to access a particular resource, a password or other identifying information is received by the gateway device 104 from an application 302. In response to receiving the password, the gateway device 104 may generate salt hash table 200 containing N salt/hash pairs. FIG. 3 illustrates a scenario where the computing environment contains K IoT devices 102 (including the gateway device 104). In an aspect, each IoT device 102 and the gateway device 104 may receive a unique identifier $0 \le k \le K-1$. For the case illustrated in FIGS. 3 K=4 and N=3. In an aspect, for each $salt_j/hash_j$ pair in the salt hash table 200 (where $0 \le j \le N-1$), the gateway device 104 may send for storage $hash_j$ value to a first IoT device 102A selected using a first modulo operation (j mod K) and may send (for storage) $salt_j$ value to a second IoT device 102B selected using a second modulo operation ((j+1)mod K). As shown in FIG. 3, by employing the aforementioned modulo operations, the gateway device 104 may send $hash_1/salt_0$ values 306 to the first IoT device 102A, $hash_2/salt_1$ values 308 to the second IoT device 102B, $hash_3/salt_2$ values 310 to the third IoT device 102C and may keep $hash_0/salt_3$ 312 for storage on the gateway device 104. In other words, the gateway device 104 breaks up each pair of the salt/hash values of the salt hash table 200 and sends the corresponding non-matching pair values to different IoT devices 102-104, so that no IoT device 102-104 stores the full matching pair of salt/hash values.

In an aspect, the communication sessions established between the gateway device 104 and the IoT devices 104 preferably are fully secure. In various aspects any conventional techniques for establishing secure communication sessions may be used. These techniques may include two-stage authentication, public key management, pretty good privacy (PGP), OpenPGP, GnuPG, public key infrastructure (PKI), and the like. PKI, for instance, unlike public key encryption between two parties, typically relies upon a trusted third party (TTP) (i.e. such as a certificate authority (CA), trusted authority, etc.). The TTP has the ability to match a registrant's identity from either a PIN or another registrant-specific identifier from transformed biometric data, or some abstraction thereof, or associated metadata with that stored by a registration authority (RA), and to issue an identity certificate.

Figure 4:
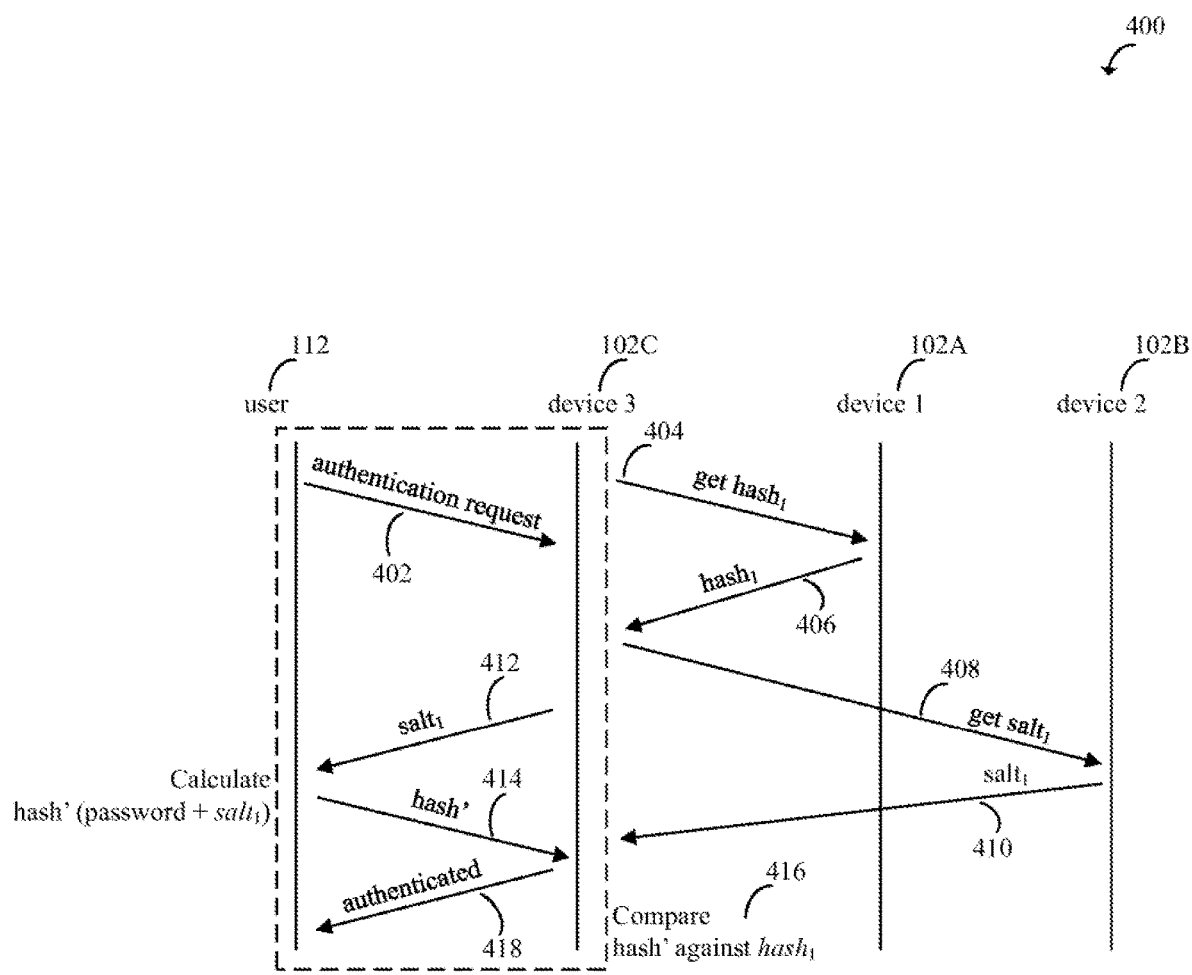
FIG. 4 is a message flow diagram of a method of performing authenticated communications.

FIG. 4 is a message flow diagram of a method 400 of performing authenticated communications. More specifically, FIG. 4 illustrates an interaction between various devices when an external user attempts to authenticate against any of the devices. To promote inter/intra-operability between various IoT devices, a flexible protocol is desired. A popular communication protocol and architecture is the Hypertext Transfer Protocol-based (HTTP) REpresentational State Transfer (REST) application programming interface (API), also referred to as "HTTP RESTful API." REST is a style of software architecture for distributed systems that may employ a standardized interface, such as HTTP. An application conforming to the REST constraints may be described as "RESTful." In some aspects, REST request/responses can be implemented based on another protocol, such as CoAP ("Constrained Application Protocol"), for example.

In some implementations, HTTP RESTful API may use open standard formats. Two popular open standard formats include JavaScript Object Notation ("JSON") and Extensive Markup Language ("XML") data formatting. Both formats employ human-readable text to transmit data objects and, thus, provide a flexible and open scheme for communication. The trade-off for such open standard formats is verbosity.

At 402, the user device 112 may send an authentication request to IoT device d (i.e., third IoT device 102C) where $0 \le d \le K-1$. For the particular packet flow illustrated in FIG. 4 d=3, j=1, K=4, and N=3. Upon receiving the authentication request, the third IoT device 102C may generate a random number j, where $0 \le j \le N-1$. In an aspect, the third IoT device 102C may select a device (for example, first IoT device 102A) from which hash value should be retrieved using, for example, j mod K operation. Similarly, the third IoT device 102C may select a device (for example, second IoT device 102B) from which salt value should be retrieved using, for example, (j+1)mod K operation.

At 404, the third IoT device 102C may send a get $hash_j$ REST message request to the selected device (first IoT device 102A) over a secure channel.

At 406, the third IoT device 102C may receive a $hash_j$ value from the first IoT device 102A.

At 408, the third IoT device 102C may send a get $salt_j$ REST message request to the selected device (second IoT device 102B) over a secure channel.

At 410, the third IoT device 102C may receive a $salt_j$ value from the second IoT device 102B.

In an aspect, upon receiving the corresponding salt and hash values, at 412, the third IoT device 102C may send the received $salt_j$ value back to the user device 112. In response, the user device 112 may calculate hash' string based on the string formed by the password appended to the $sal_j$.

At 414, the user device 112 may send the calculated hash' string to the third IoT device 102C.

At 416, the third IoT device 102C may compare the hash' string received from the user device 112 with $hash_j$ value received from the first IoT device 102A.

In response to determining that these hash values match exactly, the third IoT device 102C may send a message back to the user device 112 indicating a successful authentication (at 418). This message completes the authentication method 400 illustrated in FIG. 4.

Figure 5:
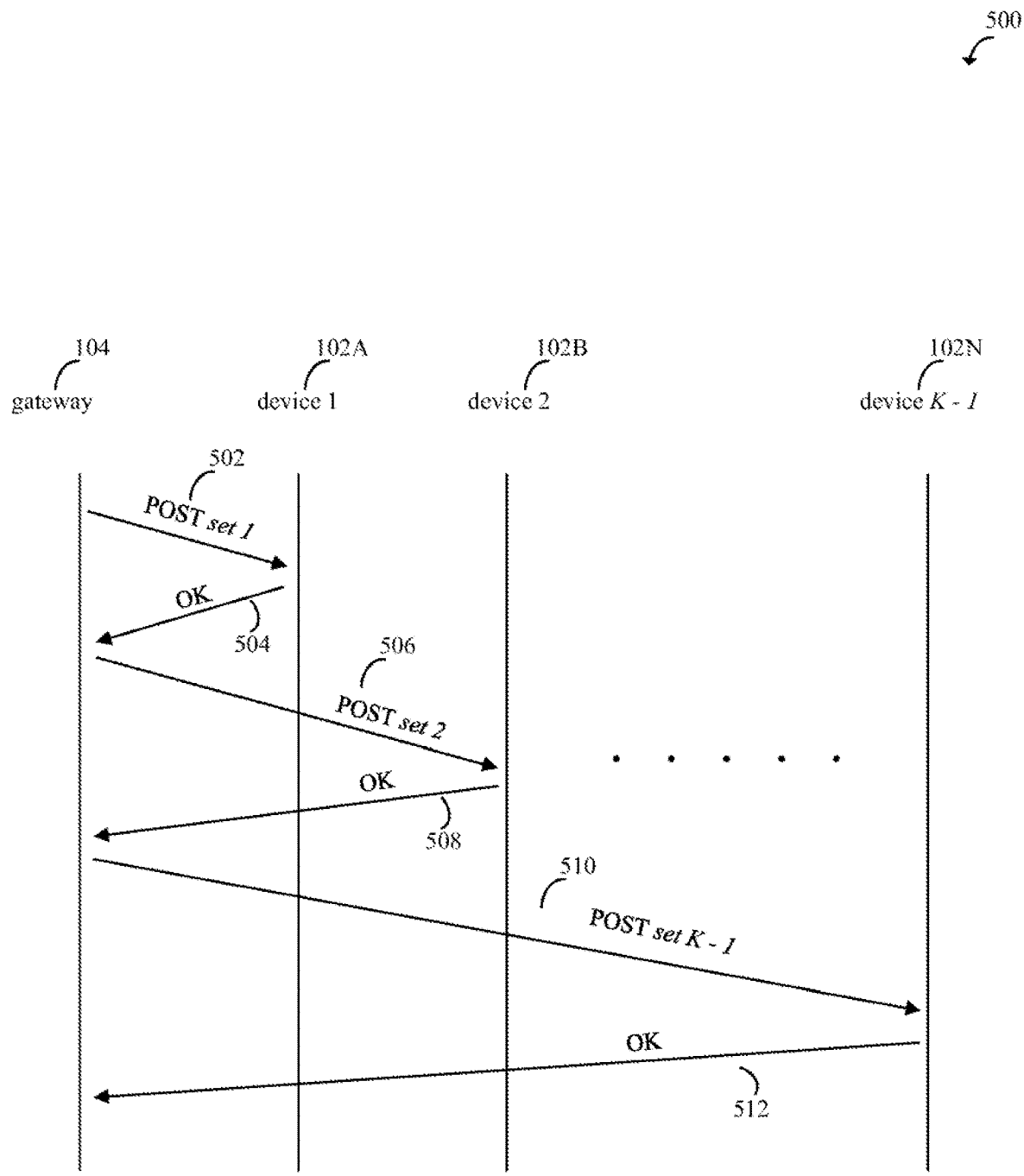
FIG. 5 is a message flow diagram of a method of performing salt/hash values distribution.

FIG. 5 is a message flow diagram of a method of performing salt/hash values distribution. Once again, to promote inter/intra-operability between various IoT devices and for ease of integration with various applications, RESTful interactions between the gateway device 104 and the other IoT devices (1 through K−1) 102A-102N may be used for salt/hash values distribution purposes. In an aspect, the gateway device 104 may group hash and salt values from the salt hash table 200 into distribution sets, based on where these values should be stored. Advantageously, hash and salt values belonging to the same pair will be included in different sets being stored at different IoT devices, where set j includes all the hash strings $hash_{j+i'K}$ with $0 \le j+i'K \le N-1$ and all the salt strings $salt_{j-1+i''K}$ with $0 \le j-1+i''K \le N-1$. In an aspect, set 0 may be stored at the gateway device 104 itself. If the hash and/or salt values are locally stored in the gateway device 104, it can retrieve these values by transmitting the request to the local REST server. All other sets (1 through K−1) may be transmitted by the gateway device 104 to other devices (1 through K−1) using REST POST requests, for example.

As shown in FIG. 5, at 502, the gateway device 104 may send a first set of salt/hash values to the first IoT device 102A.

At 506, the gateway device 104 may send a second set of salt/hash values to the second IoT device 102B and so on.

At 510, the gateway device 104 may send set (K−1) of salt/hash values to the K−1 IoT device 102N.

In an aspect, after storing the corresponding sets of salt/hash values the IoT devices 102A, 102B, . . . , 102N may send back REST OK responses 504, 508, . . . , 512, respectively.

In an aspect, all hash and string values distributed by the gateway device 104 may be encoded as base 64 strings.

Figure 6:
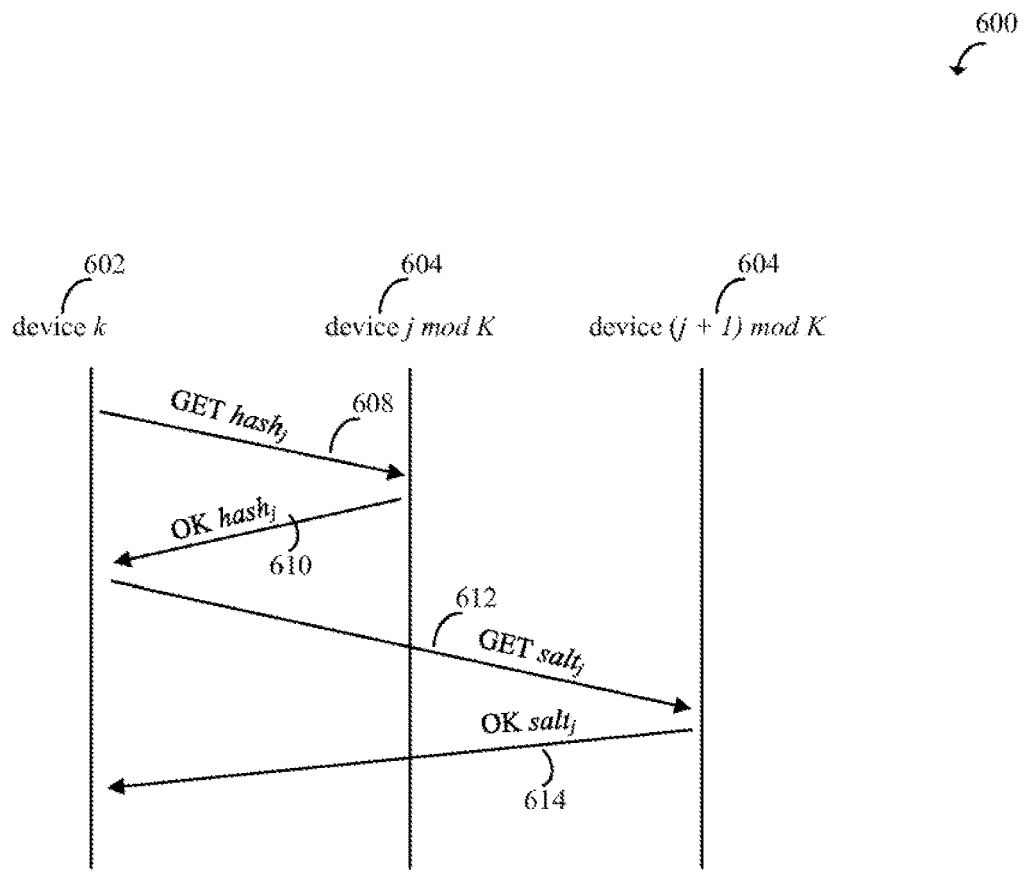
FIG. 6 is a message flow diagram of a method of performing retrieval of salt/hash values.

FIG. 6 is a message flow diagram of a method of performing retrieval of salt/hash values. The retrieval method 600 may also employ RESTful interactions between the IoT devices. A device needing hash or/and salt strings that are not locally stored in the device, may transmit REST GET requests to retrieve the needed strings from the corresponding device. As shown in FIG. 6, the device K 602 needing the hash and salt values may first determine which devices store the corresponding values using j mod K and (j+1)mod K operations, for example.

At 608 and 612, the device K may send REST GET requests to the corresponding devices 604 and 606. In an aspect, these REST GET requests may include the index of the hash/salt string being retrieved.

At 610 and 614, the responses from the corresponding devices 604 and 606 may include the corresponding hash or salt values encoded as base 64; strings.

In other words, from the perspective of the first IoT device (e.g., first access control device), the method 400 includes a method for authenticating a user device using a plurality of access control devices storing distributed entries of a salt hash table. The method includes receiving, by a first access control device, an authentication request from the user device. The authentication request includes a password. A random number is generated by the first access control device. A hash value request message is sent by the first access control device to a second access control device selected using a first mathematical function based on the generated random number. The second access control device stores a first set of mismatched pairs of salt values and hash values of the salt hash table including the hash value that is associated with the random number. A salt value request message is sent, by the first access control device, to a third access control device selected using a second mathematical function based on the generated random number. The third access control device stores a second set of mismatched pairs of salt values and hash values of the salt hash table including the salt value that is associated with the random number. The salt value is sent, by the first access control device, to the user device, in response to receiving the salt value from the third access control device. A hash string is received, by the first access control device, from the user device. The hash string is compared, by the first access control device, with the hash value received from the second access control device. A successful authentication response is sent, by the first access control device, to the user device, in response to determining that the hash string received from the user device is equal to the hash value received from the second access control device.

Similarly and in other words, from the perspective of the gateway device 104, the method 500 includes a method of performing authenticated communications that includes receiving, by a gateway device, a password associated with an application. The gateway device is in communication with a plurality of access control devices associated with the application. Access to each device in a cluster formed by the gateway device and the plurality of access control devices requires a user authentication associated with the password. The gateway device generates a plurality of different matching pairs of salt values and hash values and deletes the password. In addition, the gateway device transmits different sets of mismatched pairs of the salt values and the hash values to at least two devices of the cluster for storage. The user authentication is based on a salt value and a hash value from the plurality of different matching pairs of salt values and hash values stored at two different devices of the cluster.

In one or any combination of these aspects, the gateway device assigns a unique identifier to each device of the cluster; for each matching pair of the plurality of matching pairs of salt values and hash values: the gateway device sends ones of the matching pair hash values to the devices of the cluster according to a first mathematical formula; and sends ones of the matching pair salt values to the devices of the cluster according to a second mathematical formula. The second mathematical formula identifies a different device than the first mathematical formula.

In one or any combination of these aspects, the salt values are generated using a random number generator.

In one or any combination of these aspects, the first mathematical function is j mod K, where j represents an index of the hash salt pair in a table of hash salt pairs and K represents a total number of the access control devices.

In one or any combination of these aspects, the second mathematical function is (j+1)mod K, where j represents an index of the hash salt pair in the table of hash salt pairs and K represents a total number of the access control devices.

In one or any combination of these aspects, the gateway device sends the different sets of mismatched pairs of the salt values and the hash values using hypertext transfer protocol (HTTP) representational state transfer (REST) messages.

In one or any combination of these aspects, the gateway device receives an authentication request from the user device and generates a random number that is smaller than a total number of the entries of the salt hash table. The authentication request includes a password. The gateway device sends a hash value request message to a first access control device selected using a first mathematical function based on the generated random number and sends a salt value request message to a second access control device selected using a second mathematical function based on the generated random number. Next, the gateway device receives a hash string from the user device; compares the hash string with the hash value received from the second access control device; and sends a successful authentication response to the user device, in response to determining that the hash string received from the user device is equal to the hash value received from the second access control device.

In one or any combination of these aspects, the hash string comprises the password appended to the salt value.

In one or any combination of these aspects, the first access control device sends the hash value request message and the salt value request message using hypertext transfer protocol (HTTP) representational state transfer (REST) messages.

In one or any combination of these aspects, the generated random number is smaller than a total number of the entries of the salt hash table.

In one or any combination of these aspects, the first access control device receives, from the gateway device, different sets of mismatched pairs of the salt values and the hash values. The user authentication is based on a salt value and a hash value from the plurality of different matching pairs of salt values and hash values stored at two different devices of the cluster.

Figure 7:
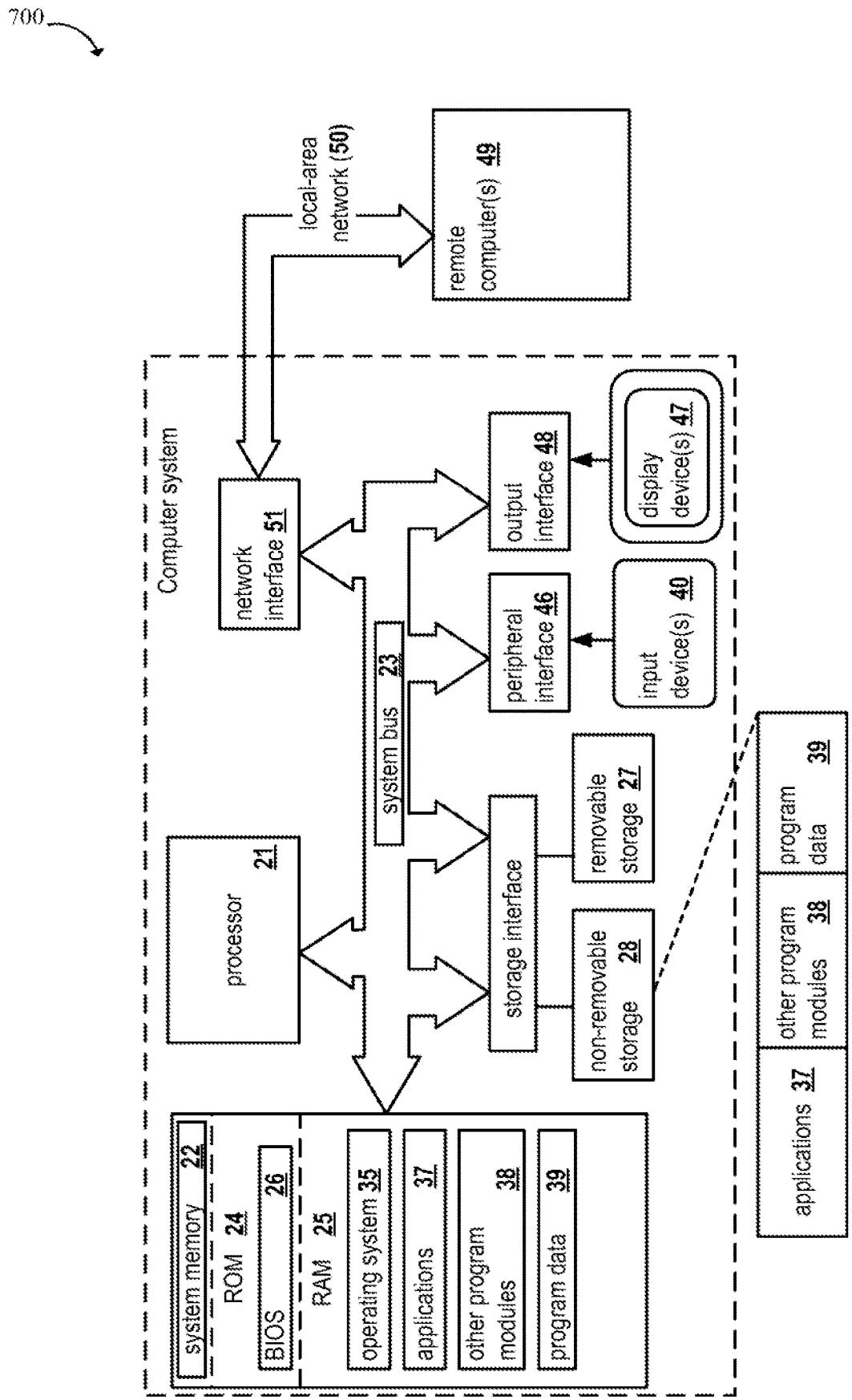
FIG. 7 is a schematic diagram of an example of a computer system configurable to implement aspects of the present disclosure.

FIG. 7 is a block diagram illustrating a computer system 700 on which aspects of systems and methods for controlling the access to confidential information may be implemented in accordance with an exemplary aspect. The computer system 700 may represent the IoT device 102 or gateway device 104 of FIG. 1 and can be in the form of multiple computing devices, or in the form of a single computing device, for example, a desktop computer, a notebook computer, a laptop computer, a mobile computing device, a smart phone, a tablet computer, a server, an embedded device, and other forms of computing devices.

As shown, the computer system 700 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 600, such as those at the time of loading the operating system with the use of the ROM 24.

The computer system 700 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 100. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 700.

The system memory 22, removable storage devices 27, and non-removable storage devices 28 of the computer system 700 may be used to store an operating system 35, additional program applications 37, other program modules 38, and program data 39. The computer system 700 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 600 may be equipped with other peripheral output devices (not shown), such as loudspeakers and other audiovisual devices The computer system 700 may operate in a network environment, using a network connection to one or more remote computers 49. The remote computer (or computers) 49 may be local computer workstations or servers comprising most or all of the aforementioned elements in describing the nature of a computer system 700. Other devices may also be present in the computer network, such as, but not limited to, routers, network stations, peer devices or other network nodes. The computer system 700 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of performing authenticated communications, comprising:
receiving, by a gateway device, a password associated with an application, wherein the gateway device is in communication with a plurality of access control devices associated with the application, and wherein access to each device in a cluster formed by the gateway device and the plurality of access control devices requires a user authentication associated with the password;
generating, by the gateway device, a plurality of different matching pairs of salt values and hash values;
deleting, by the gateway device, the password; and
transmitting, by the gateway device, different sets of mismatched pairs of the salt values and the hash values to at least two devices of the cluster for storage, wherein the user authentication is based on a salt value and a hash value from the plurality of different matching pairs of salt values and hash values stored at two different devices of the cluster.

2. The method of claim 1, further comprising:
assigning, by the gateway device, a unique identifier to each device of the cluster;
for each matching pair of the plurality of matching pairs of salt values and hash values:
sending ones of the matching pair hash values to the devices of the cluster according to a first mathematical formula; and
sending ones of the matching pair salt values to the devices of the cluster according to a second mathematical formula, wherein the second mathematical formula identifies a different device than the first mathematical formula.

3. The method of claim 2, wherein the salt values are generated using a random number generator.

4. The method of claim 2, wherein the first mathematical function is j mod K, wherein j represents an index of the hash salt pair in a table of hash salt pairs and K represents a total number of the access control devices.

5. The method of claim 4, wherein the second mathematical function is (j+1)mod K, wherein j represents an index of the hash salt pair in the table of hash salt pairs and K represents a total number of the access control devices.

6. The method of claim 1, wherein the gateway sends the different sets of mismatched pairs of the salt values and the hash values using hypertext transfer protocol (HTTP) representational state transfer (REST) messages.

7. The method of claim 1, wherein the gateway communicates with the plurality of access control devices using secured communication channels.

8. The method of claim 1, further comprising:
receiving, by the gateway device, an authentication request from the user device, wherein the authentication request includes a password;
generating, by the gateway device, a random number that is smaller than a total number of the entries of the salt hash table;
sending, by the gateway device, a hash value request message to a first access control device selected using a first mathematical function based on the generated random number;
sending, by the gateway device, a salt value request message to a second access control device selected using a second mathematical function based on the generated random number;
sending, by the gateway device, the salt value to the user device, in response to receiving the salt value from the second access control device;
receiving, by the gateway device, a hash string from the user device;
comparing, by the gateway device, the hash string with the hash value received from the second access control device; and
sending, by the gateway device, a successful authentication response to the user device, in response to determining that the hash string received from the user device is equal to the hash value received from the second access control device.

9. A method for authenticating a user device using a plurality of access control devices storing distributed entries of a salt hash table, comprising:
receiving, by a first access control device, an authentication request from the user device, wherein the authentication request includes a password;
generating, by the first access control device, a random number;
sending, by the first access control device, a hash value request message to a second access control device selected using a first mathematical function based on the generated random number, wherein the second access control device stores a first set of mismatched pairs of salt values and hash values of the salt hash table including the hash value that is associated with the random number;
sending, by the first access control device, a salt value request message to a third access control device selected using a second mathematical function based on the generated random number, wherein the third access control device stores a second set of mismatched pairs of salt values and hash values of the salt hash table including the salt value that is associated with the random number;
sending, by the first access control device, the salt value to the user device, in response to receiving the salt value from the third access control device;
receiving, by the first access control device, a hash string from the user device;
comparing, by the first access control device, the hash string with the hash value received from the second access control device; and
sending, by the first access control device, a successful authentication response to the user device, in response to determining that the hash string received from the user device is equal to the hash value received from the second access control device.

10. The method of claim 9, wherein the salt values are generated using the random number generator.

11. The method of claim 9, wherein the hash string comprises the password appended to the salt value.

12. The method of claim 9, wherein the first mathematical function is j mod K, wherein j represents an index of the hash salt pair in the table and K represents a total number of the access control devices.

13. The method of claim 12, wherein the second mathematical function is (j+1)mod K, wherein j represents an index of the hash salt pair in the table and K represents a total number of the access control devices.

14. The method of claim 9, wherein the first access control device sends the hash value request message and the salt value request message using hypertext transfer protocol (HTTP) representational state transfer (REST) messages.

15. The method of claim 9, wherein the generated random number is smaller than a total number of the entries of the salt hash table.

16. The method of claim 9, further comprising receiving, by the first access control device from the gateway device, different sets of mismatched pairs of the salt values and the hash values, wherein the user authentication is based on a salt value and a hash value from the plurality of different matching pairs of salt values and hash values stored at two different devices of the cluster.

17. A system for authenticating a user device using a plurality of access control devices storing distributed entries of a salt hash table, the system comprising:
a hardware processor of a first access control device configured to:
receive an authentication request from the user device, wherein the authentication request includes a password;
generate a random number;
send a hash value request message to a second access control device selected using a first mathematical function based on the generated random number, wherein the second access control device stores a first set of mismatched pairs of salt values and hash values of the salt hash table including the hash value that is associated with the random number;
send a salt value request message to a third access control device selected using a second mathematical function based on the generated random number, wherein the third access control device stores a second set of mismatched pairs of salt values and hash values of the salt hash table including the salt value that is associated with the random number;
send the salt value to the user device, in response to receiving the salt value from the third access control device;
receive a hash string from the user device;
compare the hash string with the hash value received from the second access control device; and
send a successful authentication response to the user device, in response to determining that the hash string received from the user device is equal to the hash value received from the second access control device.

18. The system of claim 17, wherein the salt values are generated using the random number generator.

19. The system of claim 17, wherein the hash string comprises the password appended to the salt value.

20. The system of claim 17, wherein the first mathematical function is j mod K, the second mathematical function is (j+1)mod K and wherein j represents an index of the hash salt pair in the table and K represents a total number of the access control devices.

21. A system for performing authenticated communications, the system comprising:
a hardware processor of a gateway device, wherein the gateway device is in communication with a plurality of access control devices associated with an application, and wherein access to each device in a cluster formed by the gateway device and the plurality of access control devices requires a user authentication associated with a password, the hardware processor configured to:
receive the password associated with the application;
generate a plurality of different matching pairs of salt values and hash values;
delete the password; and
transmit different sets of mismatched pairs of the salt values and the hash values to at least two devices of the cluster for storage, wherein the user authentication is based on a salt value and a hash value from the plurality of different matching pairs of salt values and hash values stored at two different devices of the cluster.

* * * * *